Oct. 19, 1937.  J. W. LEIGHTON  2,096,117
HINGED JOINT FOR WISHBONE ARMS OF INDEPENDENT WHEEL SUSPENSION
Original Filed Sept. 22, 1934
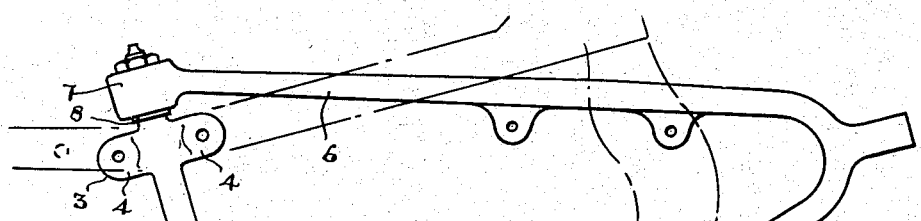
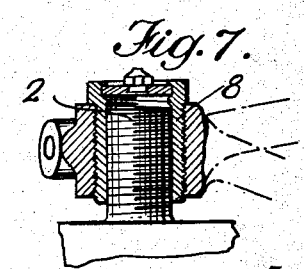
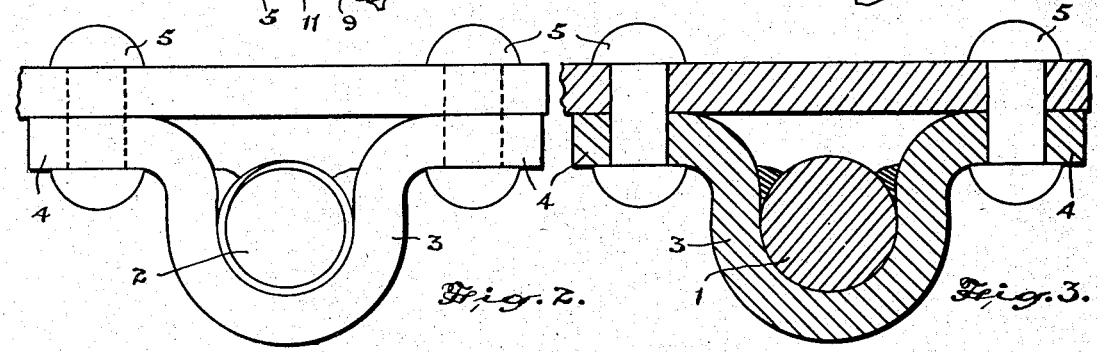
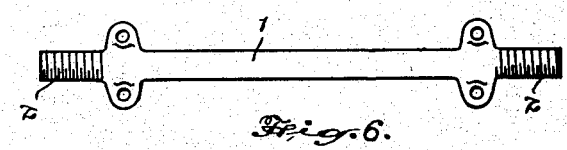
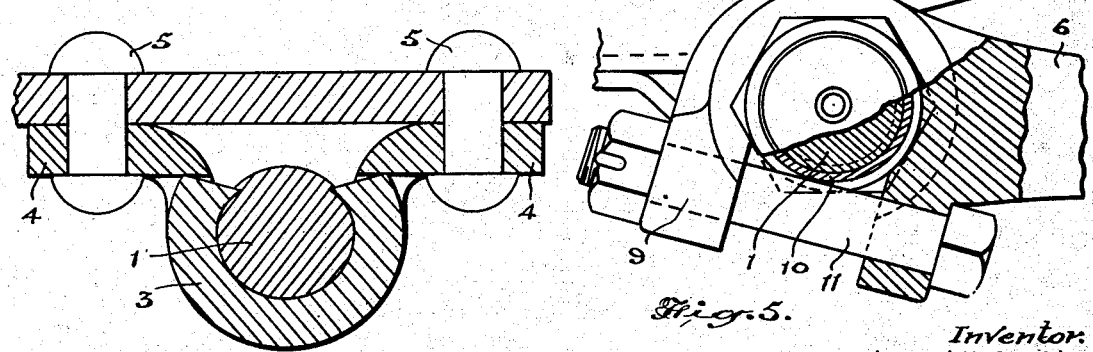
Inventor:
John Wycliffe Leighton.

Patented Oct. 19, 1937

2,096,117

UNITED STATES PATENT OFFICE 2,096,117

HINGED JOINT FOR WISHBONE ARMS OF INDEPENDENT WHEEL SUSPENSION

John Wycliffe Leighton, Port Huron, Mich.

Application September 22, 1934, Serial No. 745,041
Renewed May 11, 1937

7 Claims. (Cl. 287—100)

The principal objects of this invention are to devise a structure which will very greatly simplify the means for pivotally supporting the inner ends of "wishbone" arms used in certain types of independent wheel suspension structures for motor cars, thereby effecting a material saving of cost in the manufacture and providing a structure which will not be liable to become displaced and will ensure a free swinging support for the arms.

The principal feature of the invention consists in the novel manner of assembling and rigidly securing the pivot bar for the "wishbone" arm upon the vehicle frame, whereby a permanently rigid structure is produced which will eliminate discrepancies in the alignment of the wishbone bearings, the said pivot bar being rigidly mounted on the vehicle frame, the ends of the wishbone being pivotally supported on suitable bearing surfaces.

In the accompanying drawing, Figure 1 is a plan view of a "wishbone" arm support constructed in accordance with this invention.

Figure 2 is an enlarged elevational view of one of the supporting brackets for the support rod for the wishbone arm.

Figure 3 is an enlarged cross section through the bracket and support rod.

Figure 4 is an enlarged cross section similar to Figure 3 illustrating a modified structure.

Figure 5 is an enlarged section taken on the line 5—5 of Figure 1.

Figure 6 is a plan view of the pivot bar shown in Figure 1.

Figure 7 is a sectional view through one of the ends of the "wishbone" arms, showing the arrangement of the bushing and support rod therein.

The "wishbone" or V-shaped type of lower support arm for individual wheel suspension is being used extensively, and numerous forms of means for connecting the widely-spaced ends of the "wishbone" to the frame of the vehicle have been proposed. Many difficulties have been encountered in connecting these spaced-apart ends of the wishbone arm to the frame in a freely-swinging joint and maintaining the desired positioning of the said arm, and the present invention contemplates an extremely simple form of fastening means which is inexpensive to build and is of such a nature as to enable a very quick and accurate assembly of the "wishbone" arm on the vehicle frame.

In my co-pending application, Serial No. 698,846, filed November 20th, 1933, I disclosed a special form of bar mounting for the inner ends of the wishbone arm of an individual wheel suspension, features of which have been incorporated in divisional application No. 130,878, filed March 15, 1937.

In the present application of this invention the wishbone pivot bar 1 is preferably formed of a length of steel rod having rolled threaded ends 2. Brackets 3, which are preferably formed of a U-shaped strap having out-turned metal ends, 10 are rigidly secured to the bar 1 adjacent to each of the threaded ends by brazing, welding or otherwise as may be found expedient, the bend of the U fitting snugly around the bar.

The out-turned ends 4 of the brackets 3 are rigidly secured to the frame of the vehicle preferably by bolts or rivets. The "wishbone" arm 6 is formed with eye ends 7 which are preferably machined with a substantially cylindrical recess which may or may not be threaded to receive the bushings 8 which are provided with threaded inner surfaces to engage in bearing contact with the threaded ends of the bar 1.

It will be understood that the pivot rod 1 is preferably assembled in the "wishbone" arm before the brackets are attached to said rod. Thus the brackets may be welded or brazed to the bar close up to the threaded ends thereof so that the threaded bearing ends of the bars will have the maximum support, and a permanent rigid structure is obtained.

In this form of structure it may be found desirable to form one or both of the ends of the "wishbone" arms with slotted or jaw members 9, the faces of the slots being spaced apart a sufficient distance so that the jaw end will slip over the threaded end of the rod. When the wishbone is thus constructed the bar may be first secured to the frame and the "wishbone" assembled with the wheel support. In securing the wishbone in place the jaw ends are slipped over the threaded journal ends of the pivot rods and the bushings 10 are inserted from the ends and locked in the jaw ends by the locking bolts 11 extending across the open jaws.

The extreme simplicity of the structure herein described will be readily apparent, and a rigid and dependable structure is produced.

What I claim as my invention is:—

1. A joint for the lower support arm of a vehicle wheel suspension, comprising a bar having threaded bearing ends, brackets of U-shape embracing said bar and permanently connected thereto and having flaring ends adapted to be rigidly secured to the vehicle frame, and a support arm having threaded bearing surfaces at the ends journalled on the threaded ends of the aforesaid bar.

2. A pivot support for the lower arm of individual wheel suspensions, comprising the combination with a bar adapted to be rigidly secured to the vehicle frame and having the ends formed with threaded bearing surfaces, of an arm having spaced-apart orificed ends, one or both of which are internally threaded and adapted to loosely receive the threaded ends of said bar, one or both of said internally threaded ends being of open jaw form to facilitate lateral entry or removal of the threaded bar portions, and bushings having external surfaces to threadedly fit into the said internally threaded ends and to be held therein from displacement, said bushings being also threaded internally to receive the threaded ends of the said bearing bar, and means for securing said arm ends on said bushings.

3. A hinge joint for the lower forked arms of independent wheel suspensions, comprising a bar having free bearing ends pivotally journalled in the forked ends of the lower arm of the wheel-supporting member, and a pair of brackets each having an open slot adapted to receive said bar, said brackets being arranged adjacent to the bearing ends and being rigidly secured thereto with their outer faces spaced apart a distance only slightly less than the distance between the inner faces of said forked arms to provide maximum support to each of said free bearing ends of the bar against lateral thrusts.

4. A frame joint for the lower control arm of an independent vehicle wheel suspension, comprising the combination with a bar adapted to be mounted on the vehicle frame and having bearing ends, of an arm having spaced apart ends orificed to loosely receive said bearing ends during assembly, said orificed ends having open side slots of a width just sufficient to permit lateral entry of said bearing ends of the bar into the orifices thereof, and bearing bushings having external surfaces to fit into the orificed ends of the arm to engage the bearing ends of said bar, and means for securing said bushings in said orificed ends.

5. A joint for the lower forked arm of vehicle wheel suspensions, comprising a bar member of a length greater than the distance between the forked ends of the arm adapted to be rigidly mounted on the frame of the vehicle, means forming a rigid connection between the vehicle frame and said bar at points spaced uniformly from the respective ends of the bar, and means for hinging the forked ends of said lower arm on the ends of said bar member with the respective forked ends in uniformly close-coupled relation to the adjacent rigid connection means of the bar and frame.

6. A joint for the lower forked support arm of a vehicle wheel suspension, comprising a bar, brackets rigid with said bar adjacent the respective ends leaving free end portions extending a short distance therebeyond, said brackets being adapted to be rigidly attached to the vehicle frame, said free end extensions being provided with threaded bearing surfaces which extend inwardly right up to said brackets, and means for mounting the forked ends of said support arm in assembled relation on the threaded ends of the aforesaid bar with the forked ends threadedly engaged with said free threaded ends and disposed immediately adjacent said brackets.

7. In a hinge joint assembly for motor vehicle wheel suspension, the combination with a pivot bar and means for mounting said bar rigidly in a substantially horizontal position on the vehicle frame, of a suspension arm having a jaw shaped end opening to the under side of the arm to receive the pivot bar, a bearing bushing for insertion in said jaw end, and a clamping bolt spanning the open side of said jaw shaped end below said pivot bar and clamping the bushing in position, said arm being adapted to function with a downward suspension thrust on said pivot bar whereby the thrust will be imposed on the upper closed side of the jaw-shaped end of the arm.

JOHN WYCLIFFE LEIGHTON.